United States Patent [19]

Duncombe et al.

[11] 4,202,726
[45] May 13, 1980

[54] LIQUID METAL COOLED FAST BREEDER NUCLEAR REACTORS

[75] Inventors: Edward Duncombe, Hale; Gordon Thatcher, Warrington, both of England

[73] Assignee: United Kingdom Atomic Energy Authority, London, England

[21] Appl. No.: 964,350

[22] Filed: Nov. 28, 1978

[30] Foreign Application Priority Data

Dec. 12, 1977 [GB] United Kingdom ............... 51635/77
Jan. 10, 1978 [GB] United Kingdom ................... 904/78

[51] Int. Cl.$^2$ ............................................. G21C 15/00
[52] U.S. Cl. ........................................ 176/18; 176/40; 176/61
[58] Field of Search .................. 176/40, 50, 61, 78, 176/43, 86 R, 17, 18

[56] References Cited

U.S. PATENT DOCUMENTS

| | | | |
|---|---|---|---|
| 3,208,913 | 9/1965 | Hennig | 176/61 |
| 3,971,698 | 7/1976 | Wolff et al. | 176/61 |
| 4,032,398 | 6/1977 | Cross et al. | 176/61 |

FOREIGN PATENT DOCUMENTS 1020668  2/1966  United Kingdom ..................... 176/43

Primary Examiner—Harvey E. Behrend
Attorney, Agent, or Firm—Larson, Taylor and Hinds

[57] ABSTRACT

A liquid metal cooled fast breeder nuclear reactor of the kind wherein the fuel assembly is submerged in a pool of liquid metal coolant in a primary vessel which is housed in a concrete vault. The fuel assembly, which comprises a multiplicity of elongate fuel pins, is sub-divided into a plurality of elongate sub-assembly constructions which upstand side-by-side. The fuel assembly has an inner zone comprised mainly of fissile material and a surrounding outer zone comprised mainly of breeder material. The sub-assemblies in the outer zone include electro-magnetic braking devices for regulating the flow of coolant through the sub-assemblies and the magnetic fields of the electro-magnetic braking devices are temperature sensitive being arranged so that as the power output of the breeder sub-assemblies increases the electro-magnetic resistance to coolant flow is reduced thereby maintaining the temperature of the coolant outlets from the sub-assemblies substantially constant.

4 Claims, 3 Drawing Figures

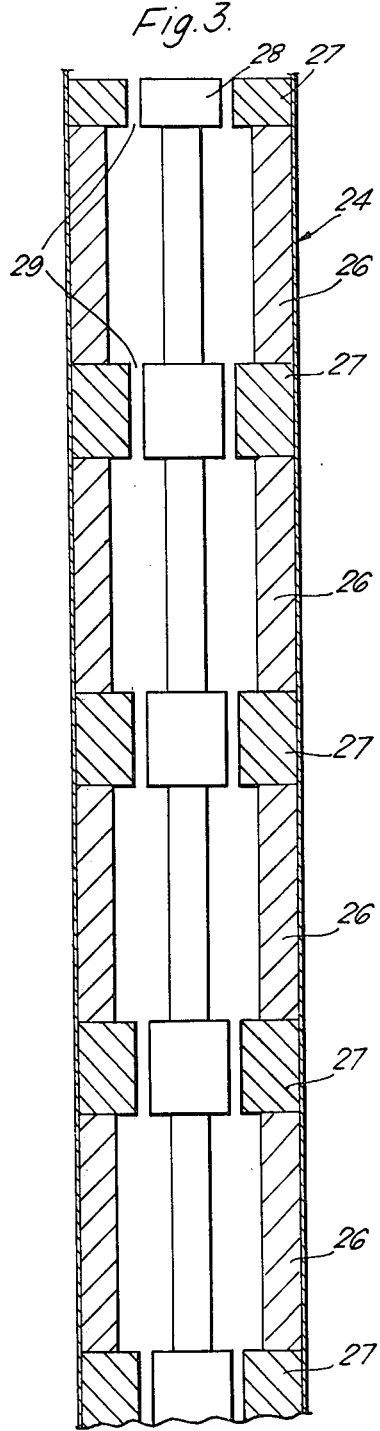

LIQUID METAL COOLED FAST BREEDER NUCLEAR REACTORS

BACKGROUND OF THE INVENTION

This invention relates to liquid metal cooled fast breeder nuclear reactors.

In a liquid metal-cooled fast breeder nuclear reactor, the fuel assembly comprises a multiplicity of slender fuel elements or pins over which liquid metal coolant such as sodium is flowed. For convenience, the fuel assembly is divided into a plurality of sub-assemblies, each comprising a plurality of fuel pins enclosed by a tubular wrapper and having a lifting head. The sub-assemblies are positioned in side-by-side array and each one is located in cantilever manner by a lower end spike which is plugged into a fuel assembly supporting structure. The sub-assemblies in the central region of the fuel assembly mainly comprise fissile material whilst the sub-assemblies in the surrounding outer region comprise breeder material. During operation of the nuclear reactor the fertile material captures neutrons emitted by fission in the fissile material to produce further fissile material. As irradiation of the fuel assembly progresses and the fissile content of the breeder material increases, fission of some of the newly formed fissile material takes place so that the power output of the breeder sub-assemblies and, therefore, the coolant temperature, progressively increase. Increased and varying temperatures of coolant streams flowing from the fuel assembly give rise to a condition known in the fast reactor art as thermal striping, a condition which, because of rapid temperature fluctuations, gives rise to cracking in reactor structure material.

An object of the invention is to provide a liquid metal cooled fast breeder nuclear reactor having means which seeks to maintain the outlet coolant temperature of at least some of the breeder sub-assemblies substantially constant throughout the life of the fuel assembly.

SUMMARY OF THE INVENTION

According to the invention in a liquid metal cooled fast breeder nuclear reactor having a fuel assembly comprising a plurality of elongate sub-assemblies upstanding in side-by-side array, the sub-assemblies in an outer zone of the fuel assembly each have an electro-magnetic braking device for regulating the flow of coolant through the sub-assembly, the magnetic fields of the electro-magnetic braking devices being temperature sensitive.

The electro-magnetic braking devices may be arranged progressively to decrease the resistance to coolant flow and thereby increase the rate of coolant flow through the sub-assemblies as the breeder power output rises during continued irradiation of the reactor fuel assembly so that the outlet coolant temperatures of the breeder sub-assemblies which include braking devices are maintained substantially constant.

DESCRIPTION OF THE DRAWINGS

A liquid metal cooled fast breeder nuclear reactor embodying the invention is described by way of example with reference to the accompanying diagrammatic drawings wherein:

FIG. 3 is a cross-sectional view of an electro-magnetic braking device.

DESCRIPTION OF THE PREFERRED EMBODIMENT

Figure 1:
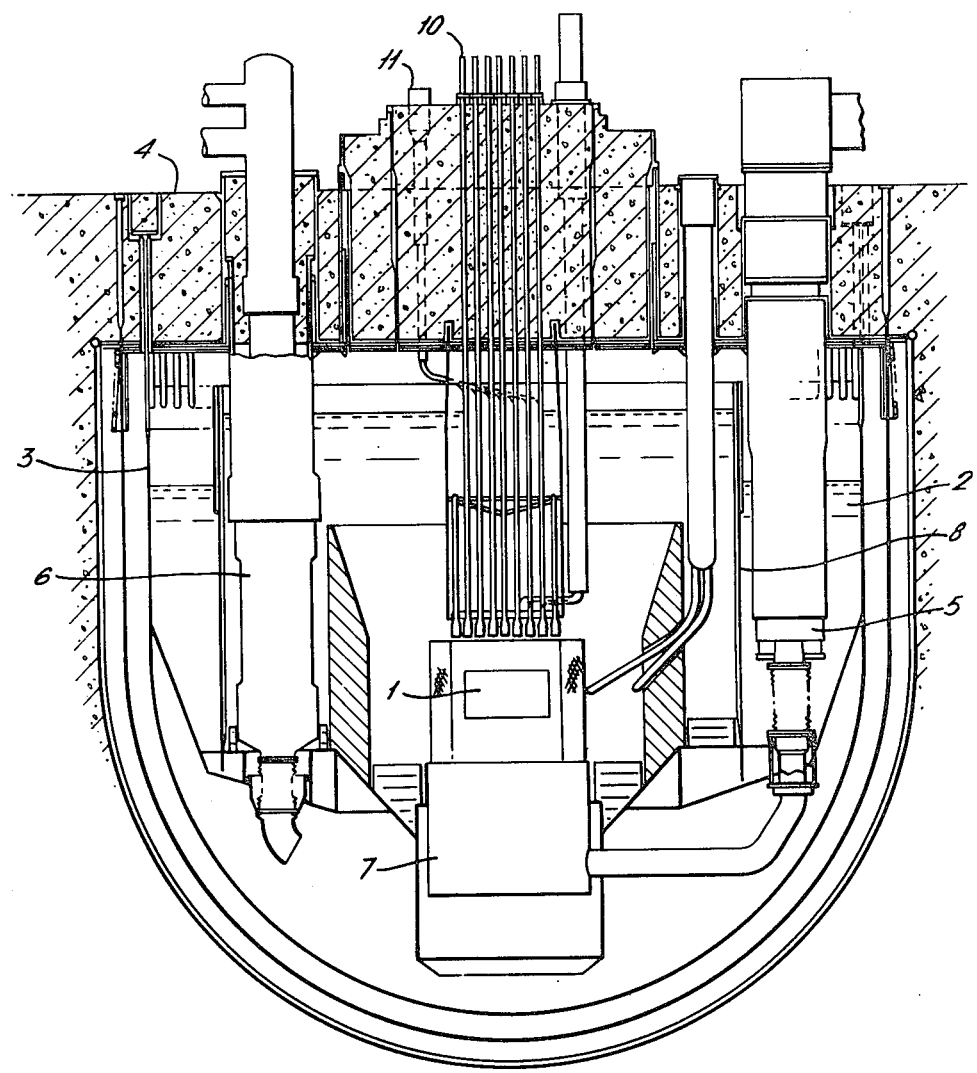
FIG. 1 is a cross-sectional view.

FIG. 1 illustrates a liquid metal cooled fast breeder nuclear reactor having a fuel assembly 1 submerged in a pool 2 of liquid sodium coolant in a primary vessel 3. The primary vessel is suspended from the roof of a containment vault 4 and there is provided a plurality of coolant pumps 5 and heat exchangers 6 only one of each of pump and heat exchangers being shown. The fuel assembly 1 mounted on a structure 7 is housed with the heat exchangers in a core tank 8 whilst the pumps 5, which deliver coolant to the diagrid, are disposed outside of the core tank. The core or fuel assembly 1 comprises a plurality of sub-assemblies 9 which upstand from the support structure 7 in closely spaced side-by-side array. Control rods 10 and instrumentation 11 penetrate the roof of the vault. The fuel assembly 1 comprises a central region having sub-assemblies 9 containing fissile or driver material and an outer annular region having sub-assemblies containing fertile or breeder material. Each of the breeder sub-assemblies has an annular electromagnetic braking device, to be described hereinafter, for regulating the flow of coolant through the breeder sub-assemblies, and the magnetic fields of the electro-magnetic braking devices are temperature sensitive so that the resistance to coolant flow is decreased as breeder power output increases during continued irradiation of the fuel assembly. The rate of coolant flow through the sub-assemblies is thereby progressively increased to maintain the coolant outlet temperature substantially constant.

Figure 2:
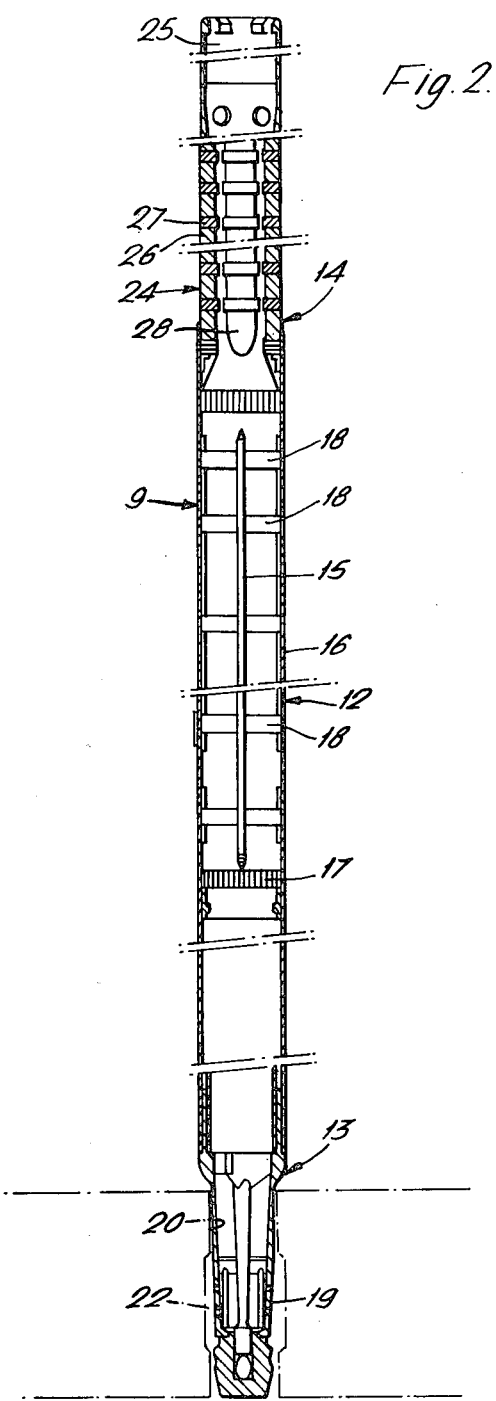
FIG. 2 is a cross-sectional view of a breeder fuel sub-assembly.

The sub-assemblies 9, as shown in FIG. 2, each comprise a central fuel section 12, a lower end locating section 13 and a tubular upper end section 14. The fuel section comprises a bundle of elongate fuel pins 15 enclosed within a tubular wrapper 16 of hexagonal cross-section, the pins being supported within the wrapper at their lower ends by a grid 17 and braced intermediate their lengths by cellular grids 18 of honeycomb form. The lower end locating section 13 comprises a spike 19 for engaging sockets 20 in a fuel assembly support structure and has apertures 22 through which coolant can flow from within the support structure. The tubular upper section 14 which defines an outlet for coolant flow has a lifting head 25.

The pins of the fuel sub-assemblies 9 in the central section of the fuel assembly contain mainly fissile material, for example, mixed oxides of Pu239 and U235, although at each end of the pins there is a quantity of fertile material for example, oxide of U238. The pins of the fuel sub-assemblies in the outer region surrounding the central region of the fuel assembly contain fertile or breeder material, for example, oxide of U238.

Each of the breeder fuel sub-assemblies in the outer region of the fuel assembly has an electro-magnetic braking device 24 mounted on the upper end of the shielding section 14 and arranged so that coolant flowing upwardly through the sub-assembly flows through the braking device.

The electro-magnetic braking device 24 as shown in FIG. 3 comprises a plurality of annular permanent magnets 26, and a plurality of annular pole pieces 27 arranged end-to-end on a common axis each magnet being disposed between a pair of pole pieces and there is a coaxial armature 28. An annular gap 29 bounded by the pole pieces and the armature defines a flow path for the liquid metal coolant flowing upwardly through the sub-assembly. The pole pieces 27 and armature 28 are of ferromagnetic material. The braking pressure of the device is dependent on the intensity of the magnetic flux conducted across the gap and the rate of flow of the coolant whereby circulatory currents are set up in the liquid metal in a plane normal to the direction of coolant flow. The circulatory currents induce an opposing force to the flow of coolant.

In operation of the nuclear reactor, liquid metal coolant drawn from the outer region of the pool is passed upwardly through the fuel sub-assemblies in heat exchange with the fuel pins 15 thence from the upper ends by way of the electro-magnetic braking devices 24. During operation of the reactor neutrons emitted by fissions in the fissile region of the fuel assembly are captured by the fertile material thereby creating within it a fissile content which progressively increases as irradiation progresses. Some of the newly created fissile material in the breeder sub-assemblies will also undergo fission, the rate of fission increasing as the fissile content increases with the result that the power output of the breeder sub-assemblies progressively increases. The electro-magnetic braking devices 24 serve to restrict flow of coolant through the breeder sub-assemblies the restrictions being temperature dependent and reducing with increased temperature so that, with increased power output, coolant flow is increased thereby maintaining the outlet temperature of the coolant substantially constant. The reduced restriction is caused by the reduced magnetic flux permeability of the magnetic materials caused by increased temperature.

A material suitable for use as pole pieces and armature is one having Curie point approximately equal to the desired coolant outlet temperature so that the device serves as a thermostat. In the described nuclear reactor, the desired coolant outlet temperature of the breeder sub-assemblies is approximately 570° C. so that an alloy of 60% nickel and 40% iron is found to be suitable for the pole pieces and armature of the electro-magnetic braking devices.

We claim:

1. A liquid metal cooled fast breeder nuclear reactor having a fuel assembly comprising a plurality of elongate sub-assemblies upstanding in side-by-side array, the sub-assemblies in an outer zone of the fuel assembly each having an electro-magnetic braking device for regulating the flow of coolant through the sub-assembly, the magnetic fields of the electro-magnetic braking devices being temperature sensitive.

2. A liquid metal cooled fast breeder nuclear reactor according to claim 1 wherein the electro-magnetic braking devices each comprise a plurality of annular permanent magnets and a plurality of annular pole pieces arranged end-to-end on a common axis, each magnet being disposed between a pair of pole pieces, and a coaxial armature, the magnets, pole pieces and armatures bounding annular flow paths for liquid metal coolant through the sub-assemblies.

3. A liquid metal cooled fast breeder nuclear reactor according to claim 2 wherein the pole pieces and armatures of the electro-magnetic braking devices are of ferromagnetic alloy.

4. A liquid metal cooled fast breeder nuclear reactor according to claim 3 wherein the pole pieces and armatures are of alloy consisting of 60% nickel and 40% iron.

* * * * *